United States Patent
Lim

(10) Patent No.: US 10,286,493 B2
(45) Date of Patent: May 14, 2019

(54) LASER PROCESSING DEVICE AND METHOD OF FORMING IDENTIFYING MARK USING THE SAME

(71) Applicant: HYUNDAI MOTOR COMPANY, Seoul (KR)

(72) Inventor: Han Pil Lim, Gunpo-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 634 days.

(21) Appl. No.: 14/877,110

(22) Filed: Oct. 7, 2015

(65) Prior Publication Data

US 2017/0015046 A1   Jan. 19, 2017

(30) Foreign Application Priority Data

Jul. 13, 2015  (KR) ........................ 10-2015-0099195

(51) Int. Cl.
| | |
|---|---|
| B41M 5/26 | (2006.01) |
| B23K 26/00 | (2014.01) |
| B23K 26/03 | (2006.01) |
| B23K 26/06 | (2014.01) |
| B23K 26/70 | (2014.01) |
| B23K 26/142 | (2014.01) |
| B23K 26/352 | (2014.01) |

(52) U.S. Cl.
CPC ........ B23K 26/352 (2015.10); B23K 26/0006 (2013.01); B23K 26/032 (2013.01); B23K 26/0643 (2013.01); B23K 26/142 (2015.10); B23K 26/355 (2018.08); B23K 26/702 (2015.10); B41M 5/267 (2013.01)

(58) Field of Classification Search
None
See application file for complete search history.

(56) References Cited

U.S. PATENT DOCUMENTS 5,528,372 A * 6/1996 Kawashima .......... H01L 21/681
    356/401
2018/0297147 A1* 10/2018 Nishikawa ........... B23K 26/032

FOREIGN PATENT DOCUMENTS

| JP | 2008-264789 A | 11/2008 |
| JP | 2011-212727 A | 10/2011 |
| JP | 2012-035281 A | 2/2012 |

OTHER PUBLICATIONS

English machine translation of JP2008264789A.*
English machine translation of JP2012035281A.*

* cited by examiner

*Primary Examiner* — David M. Gray
*Assistant Examiner* — Geoffrey T Evans
(74) *Attorney, Agent, or Firm* — Brinks Gilson & Lione

(57) ABSTRACT

A laser processing device is provided, including: a laser beam irradiating apparatus irradiating a laser beam to a marked object; an angle adjusting apparatus connected with the laser beam irradiating apparatus to adjust an irradiation angle of the laser beam; a photographing apparatus photographing an area where the laser beam is irradiated; and a guide beam reflective mirror positioned on a movement path of the laser beam, in which the laser beam is a processing laser beam or a guide beam which marks the marked object.

12 Claims, 6 Drawing Sheets

LASER PROCESSING DEVICE AND METHOD OF FORMING IDENTIFYING MARK USING THE SAME

CROSS-REFERENCE TO RELATED APPLICATION

This application claims the benefit of Korean Patent Application No. 10-2015-0099195, filed on Jul. 13, 2015, which is incorporated herein by reference in its entirety.

FIELD

The present disclosure relates to a laser processing device, and more particularly, to a laser processing device capable of forming an identification mark.

BACKGROUND

The statements in this section merely provide background information related to the present disclosure and may not constitute prior art.

In general, in a vehicle production line, a radio frequency identification reader (RFID) is installed and a vehicle production process is performed while verifying produced vehicles by using a vehicle tracking system. In each produced vehicle or component, an RF identification tag for the vehicle tracking system is attached.

As a result, the RF tag which is attached to a vehicle in which the production process ends to be completed or a component according to a kind of production vehicle is read by an RFID receiving an RF signal while performing the process.

Here, the RF tag is formed as a plate storing information of the vehicle and production information regarding a color of the vehicle and a shape of a vehicle body, and the like, so as to identify and verify each production vehicle passing through the corresponding line.

A fastening pin protrudes from a rear surface of the RF tag so as to be fixed to a fastening hole formed in the vehicle component. Accordingly, when the component reaches the corresponding line, an operator installs the fastening pin of the corresponding RF tag to the fastening hole.

The RF tag is assembled and installed through an RF tag installation apparatus including an RF tag supply unit installed in a conveying line of the component, a draw-out unit for drawing out the RF tag from the RF tag supply unit, and a fastening unit for installing the RF tag drawn-out from the draw-out unit to the fastening hole of the conveyed vehicle component.

However, in the related art, due to a usage of an information storage medium such as an RFID, since the RF tag needs to be replaced during the change of the RFID, there is a problem in that costs are generated.

Further, there are problems in that the RFID cannot recognize the information of the RF tag attached to the vehicle body after painting the vehicle or if the information storage medium is damaged during separate processing.

SUMMARY

The present disclosure provides a laser processing device and a method of forming an identification mark using the same having advantages of forming an identification mark such as a QR code so as to recognize vehicle information using the identification mark.

Further, the present disclosure provides a laser processing device and a method of forming an identification mark using the same having advantages of reducing a recognition error due to the identification mark by accurately adjusting a focus of a laser beam even though a position of an object with the identification mark is changed.

An exemplary form of the present disclosure provides a laser processing device including: a laser beam irradiating apparatus irradiating a laser beam to a marked object; an angle adjusting apparatus connected with the laser beam irradiating apparatus to adjust an irradiation angle of the laser beam; a photographing apparatus photographing an area where the laser beam is irradiated; and a guide beam reflective mirror positioned on a movement path of the laser beam, in which the laser beam is a processing laser beam or the guide beam which marks the marked object.

The laser beam irradiating apparatus may include at least one laser beam reflective mirror for changing an irradiation path of the laser beam.

The guide beam reflective mirror may transmit the processing laser beam.

The guide beam may be reflected to the surface of the marked object to display a guide pattern.

The guide pattern may include a plurality of first guidelines which is extended in one direction and spaced apart from each other, and a plurality of second guidelines which is extended in a direction crossing the first guidelines and spaced apart from each other.

The guide beam may be reflected to the surface of the marked object so that line widths of the first guidelines may be the same as each other and line widths of the second guidelines may be the same as each other.

Another exemplary form of the present disclosure provides a method of forming an identification mark by using the laser processing device, the method including: preparing a marked object; reflecting a guide beam to the marked object to display a guide pattern on the surface of the marked object; obtaining a guide image by photographing the guide pattern; determining whether the marked object is distorted from the guide pattern; and forming the identification mark on the marked object by irradiating a processing laser beam from the laser irradiating apparatus, in which in the forming of the identification mark, when the marked object is distorted, the laser beam is directed after changing the irradiation angle by the angle adjusting apparatus of the laser irradiating apparatus.

The guide pattern may include a plurality of first guidelines which are extended in one direction and spaced apart from each other, and a plurality of second guidelines which are extended in a direction crossing the first guidelines and spaced apart from each other.

In the forming of the guide pattern, the guide pattern is reflected so that line widths of the first guidelines are the same as each other and line widths of the second guidelines are the same as each other.

In the determining of whether the marked object is distorted, when the marked object is distorted, the line widths of the plurality of first guidelines may be measured to be different from each other.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
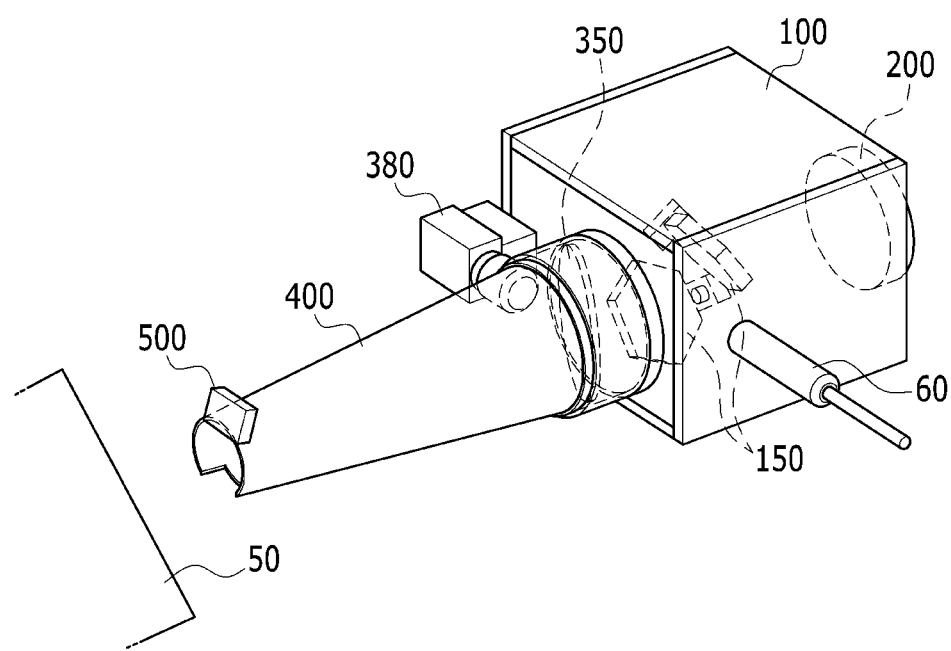
FIG. 1 is a block diagram schematically illustrating a laser processing device according to an exemplary form of the present disclosure.

The drawings described herein are for illustration purposes only and are not intended to limit the scope of the present disclosure in any way.

<Description of symbols>

| | |
|---|---|
| 31, 32, 33, 34: Guideline | 50: Marked object |
| 60: Laser transmission fiber | 100: Laser beam irradiating apparatus |
| 150: Laser beam reflective mirror | 200: Angle adjusting apparatus |
| 300: Guide pattern | 350: Guide beam reflective mirror |
| 380: Photographing apparatus | 400: Safety local barrier |
| 500: Air supply unit | |

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 illustrates a laser processing device according to an exemplary form of the present disclosure.

As illustrated in FIG. 1, a laser processing device according to one form of the present disclosure includes a laser beam irradiating apparatus 100, an angle adjusting apparatus 200 connected to one side of the laser beam irradiating apparatus, a guide beam reflective mirror 350 positioned on a path of a laser beam, a photographing apparatus 380, a laser safety local barrier 400, and an air supply unit 500.

The laser beam irradiating apparatus 100 includes a plurality of laser beam reflective mirrors 150 which change a path of the laser beam transmitted through a laser transmission fiber 60 to transfer the laser beam to a marked object.

The laser beam reflective mirror 150 is positioned on a movement path of the laser beam and adjusts the movement path of the laser beam transferred from the laser transmission fiber 60. That is, the laser beam reflective mirror 150 may change the path of the laser beam by reflecting the laser beam inputted from the laser transmission fiber so as to irradiate the laser beam to the marked object.

The laser transmission fiber 60 is positioned between a laser oscillator (not illustrated) and the laser beam irradiating apparatus 100, and transmits the laser beam transferred from the laser oscillator to the laser beam irradiating apparatus. The laser oscillator (not illustrated) as an apparatus of outputting the laser beam or the guide beam, adjusts a strength or a generation cycle of the laser beam outputted according to control of a controller (not illustrated) to generate the pattern of the guide beam.

The laser transmission fiber 60 may integrate multiple beams transferred from the laser oscillator into one or distribute the multiple beams according to a form and an output of the laser to be irradiated.

Further, after the laser oscillator is positioned far away from the laser irradiating apparatus according to an operation environment, the laser beam may be transferred to the laser irradiating apparatus by using the laser transmission fiber.

The angle adjusting apparatus 200 is connected with the laser beam irradiating apparatus 100 to move the laser beam irradiating apparatus to upper, lower, left, and right sides. When the angle of the laser beam irradiating apparatus is adjusted by using the angle adjusting apparatus 200, an irradiation direction of the laser beam is changed. When the focus of the laser beam is not accurate, the laser beam may be irradiated to the marked object in a state where the focus of the laser beam is accurately aimed by changing the position of the laser beam irradiating apparatus by using the angle adjusting apparatus 200.

The angle adjusting apparatus 200 may include a rotation apparatus which is movable in a vertical direction and a rotation apparatus which is movable in a horizontal direction, and may further include a fixing apparatus for maintaining a predetermined angle.

The photographing apparatus 380 may be a line camera, an area camera, a charged coupled device (CCD), or a CMOS image sensor, and in addition, various image capture means may be used. The photographing apparatus 380 may be connected with a monitor (not illustrated), and the monitor may be a means which outputs an image photographed in the photographing apparatus.

The guide beam reflective mirror 350 is positioned on a moving path of the laser beam to transmit the laser beam for processing. The guide beam reflective mirror 350 allows the guide pattern formed on the surface of the marked object to be photographed by the photographing apparatus.

That is, the photographing apparatus may be installed in a direction perpendicular to the moving path of the laser beam, and may not directly photograph the guide pattern positioned in an area where the laser beam is irradiated. The guide pattern formed on the marked object is reflected to the guide beam reflective mirror 350 and the photographing apparatus 380 photographs the guide pattern reflected to the guide beam reflective mirror 350.

Accordingly, the photographing apparatus is installed to exactly photograph the guide pattern formed on the marked object by adjusting the angle of the guide beam reflective mirror 350.

The laser safety local barrier 400 prevents the laser beam from being exposed to the outside. Accordingly, the laser safety local barrier 400 is formed to surround a path through which the laser beam passes and thus the laser beam penetrates the laser safety local barrier 400.

The air supply unit 500 is used to irradiate processing gas to a position where the laser beam is irradiated, and the processing gas may be supplied when the laser beam is irradiated. The processing gas removes plasma generated on a metal surface to reduce a plasma shielding effect.

The laser processing device according to the exemplary form of the present disclosure may be used in a process of generating a vehicle body identification marker (e.g., a type of matrix barcode) on one surface of the vehicle body in an assembly plant for the vehicle body. For example, the identification marker of the vehicle body may be a machine-readable optical label that contains information about the item to which it is attached, for example, a QR code, and the machine-readable optical label or the QR code may be formed on the vehicle body by using the laser processing device.

However, the present disclosure is not limited thereto, and the QR code may be used for all objects to mark the QR code by using a laser.

Hereinafter, a method of marking the machine-readable optical label such as the QR code through the laser processing device according to the exemplary form of the present disclosure will be described in detail with reference to FIGS. 2 to 6 in addition to FIG. 1 described above.

Figure 2:
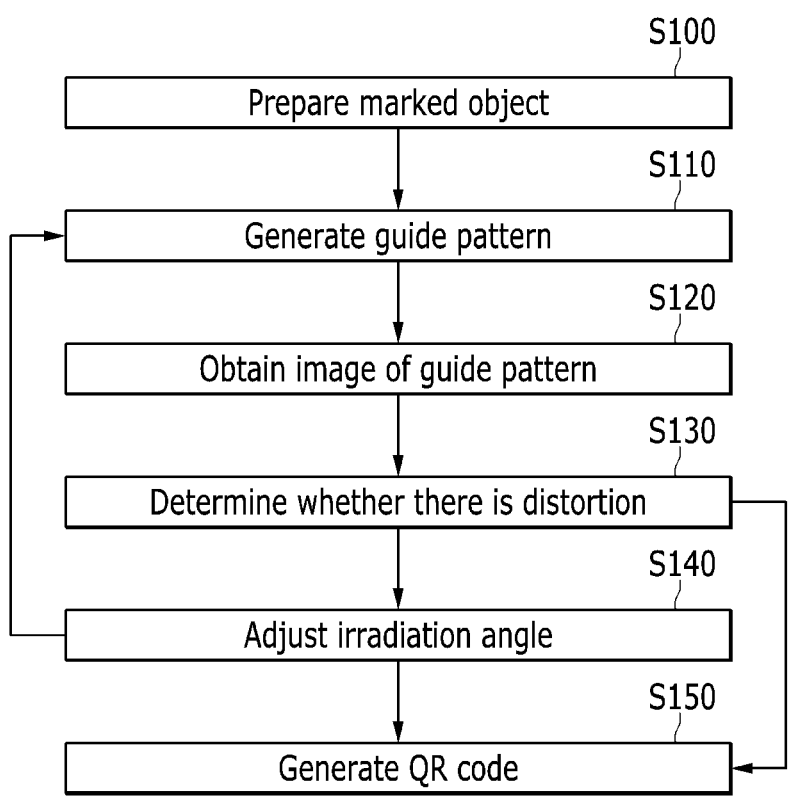
FIG. 2 is a flowchart for describing a method of marking a matrix barcode such as a QR code by using the laser processing device according to the exemplary form of the present disclosure.
Figure 3:
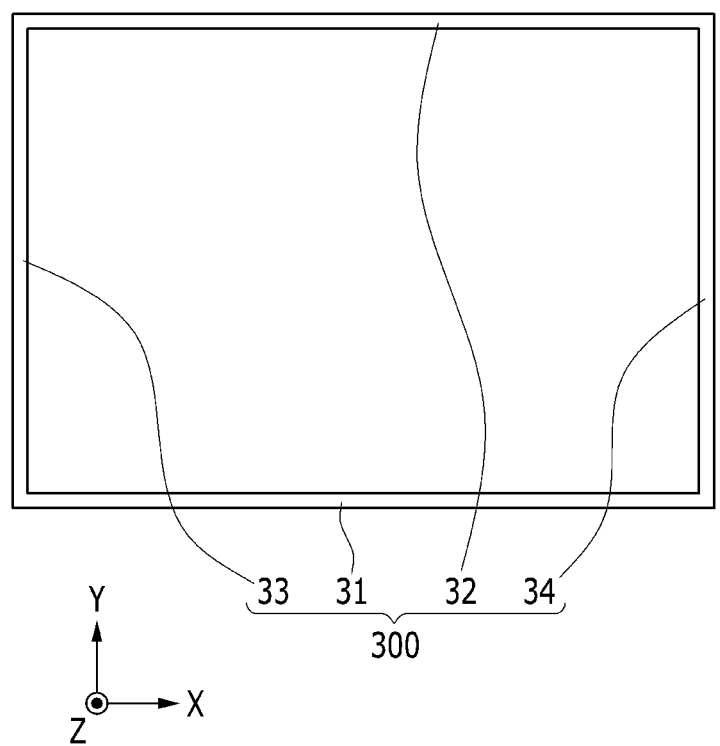
FIG. 3 is a diagram illustrating a guide pattern according to the exemplary form of the present disclosure.
Figure 4:
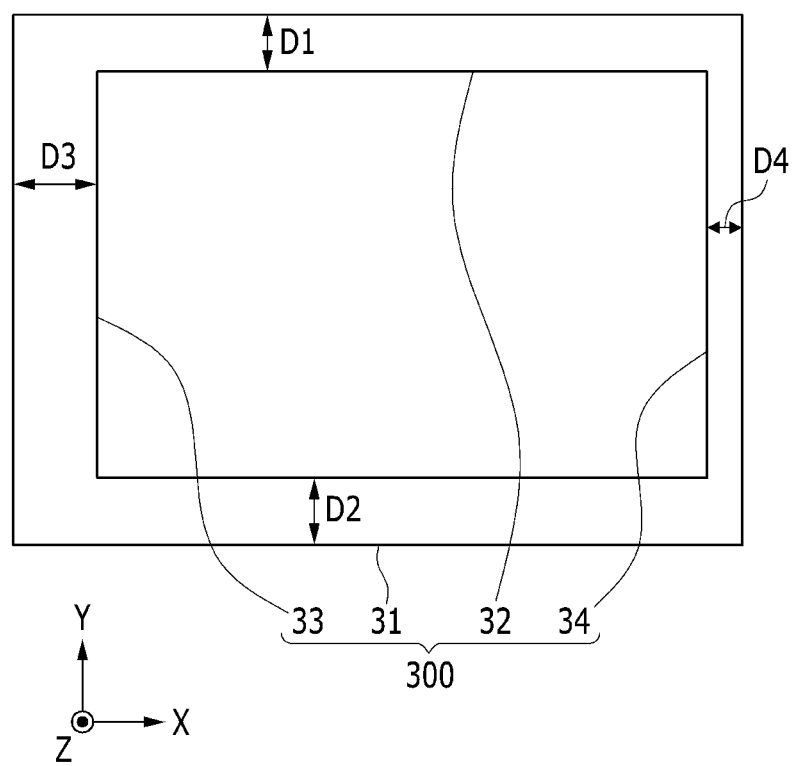
FIGS. 4 and 5 are diagrams illustrating distortion of the guide pattern according to the exemplary form of the present disclosure.
Figure 5:
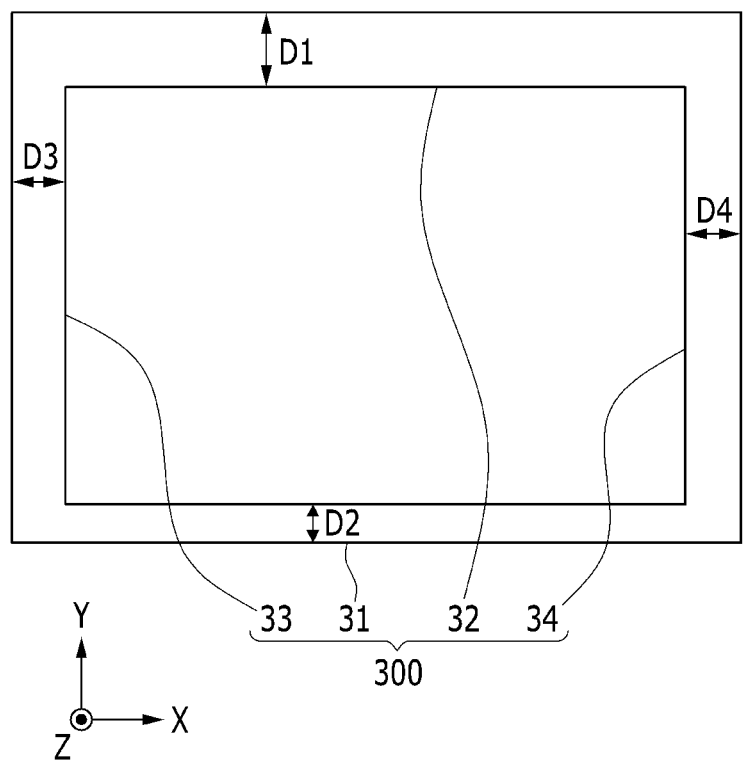
Figure 6:
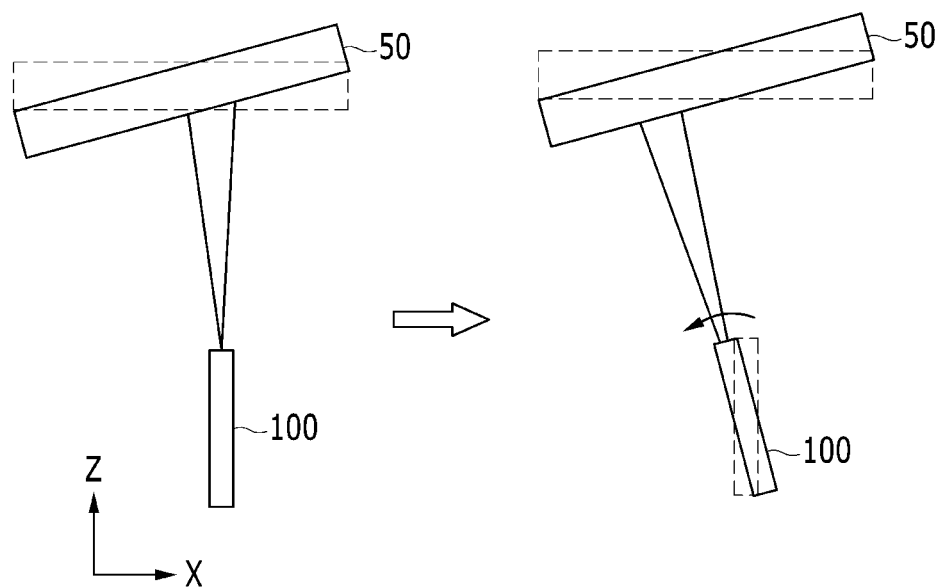
FIG. 6 is a diagram for describing a method of adjusting a laser irradiation angle according to the exemplary form of the present disclosure.

FIG. 2 is a flowchart for describing a method of marking a QR code by using the laser processing device according to the exemplary form of the present disclosure, FIG. 3 is a diagram illustrating a guide pattern according to the exemplary form of the present disclosure, FIGS. 4 and 5 are diagrams illustrating distortion of the guide pattern according to the exemplary form of the present disclosure, and FIG. 6 is a diagram for describing a method of adjusting a laser irradiation angle according to the exemplary form of the present disclosure.

As illustrated in FIG. 2, the method includes preparing a marked object (S100), generating a guide pattern on the marked object (S110), obtaining a guide image by photographing the guide pattern (S120), determining whether there is distortion (S130), adjusting an irradiation angle of the laser irradiating apparatus (S140), and generating a QR code on the marked object (S150).

In the preparing of the marked object (S100), the marked object may be, for example, one surface of the vehicle.

In the generating of the guide pattern (S110), the guide pattern is formed on the marked object by irradiating the guide beam to the marked object. The guide beam may be generated by a laser which may display an identifiable image on the surface of the marked object, for example, a laser pointer.

The guide pattern 300 may include four guidelines 31, 32, 33, and 34 having predetermined thicknesses as illustrated in FIG. 3. That is, the guide pattern 300 includes two guidelines 31 and 32 which are parallel to an X axis and spaced apart from each other and two guidelines 33 and 34 which are parallel to a Y axis and spaced apart from each other, and may be disposed to substantially form a quadrangle. FIG. 3 illustrates that one end of each guideline is connected, but the present disclosure is not limited thereto, and one end of each guideline may be disposed so as to not be continuous. Further, in FIG. 3, in order to verify distortion of upper, lower, left, and right sides, four lines are described as an example, but the present disclosure is not limited thereto, and more guidelines may be formed if necessary.

In the obtaining of the image of the guide pattern (S120), the guide pattern 300 may be photographed and imaged by using the photographing apparatus to be output to a monitor. That is, when the guide beam is reflected on the surface of the marked object, the guide pattern is displayed on the surface of the marked object, the guide pattern is reflected on the guide beam reflective mirror, and the photographing apparatus photographs the guide pattern reflected on the guide beam reflective mirror.

In the determining of whether there is distortion (S130), a tilted degree of the marked object is calculated from the photographed image.

In order to facilitate the description, forming a pair of guidelines (hereinafter referred to as a first guideline and a second guideline) parallel to the X axis and a pair of guidelines (hereinafter referred to as a third guideline and a fourth guideline) parallel to the Y axis will be described as an example. In this case, the first guideline 31 and the second guideline 32 have the same widths, and the third guideline 33 and the fourth guideline 34 have the same widths.

The widths of the first guideline 31 to the fourth guideline 34 are measured from the photographed image. In the case where the focus of the laser beam is accurate, the line widths of the first guideline 31 and the second guideline 32 are measured to be the same as each other and the line widths of the third guideline 33 and the fourth guideline 34 are measured to be the same as each other.

However, when the marked object rotates and is distorted in a counterclockwise direction based on the Y axis, as illustrated in FIG. 4, the line width D3 of the third guideline 33 and the line width D4 of the fourth guideline 34 are measured to be different from each other. That is, when the marked object is distorted, since a distance from the laser irradiating apparatus to the third guideline 33 and the fourth guideline 34 varies, the line width D3 of the third guideline 33 and the line width D4 of the fourth guideline 34 are measured to be different from each other. For example, the line widths D3 and D4 of two guidelines are equally 0.1 mm at a median focus, but when the focus is distorted, the line width D3 of the third guideline is measured to be 0.2 mm to 0.3 mm and the line width D4 of the fourth guideline may be measured to be smaller than 0.1 mm.

On the contrary, when the marked object is rotated and distorted in a clockwise direction based on the Y axis, the line width D4 of the fourth guideline may be increased and the line width D3 of the third guideline may be decreased.

Further, when the marked object rotates based on the X axis to be distorted, as illustrated in FIG. 5, the line width D1 of the first guideline 31 and the line width D2 of the second guideline 32 are measured to be different from each other. That is, when the marked object is distorted, since a distance from the laser irradiating apparatus to the first guideline and the second guideline varies, the line width D1 of the first guideline 31 and the line width D2 of the second guideline 32 are measured to be different from each other. For example, the line widths D1 and D2 of two guidelines are equally 0.1 mm at a median focus, but when the focus is distorted, the line width D1 of the first guideline 31 is measured to be 0.2 mm to 0.3 mm and the line width D2 of the second guideline 32 may be measured to be smaller than 0.1 mm.

On the contrary, when the marked object is rotated and distorted in an opposite direction based on the X axis, the line width D2 of the second guideline 32 may be increased and the line width D1 of the first guideline 31 may be decreased.

As such, in the exemplary form of the present disclosure, when the guide pattern is formed, whether the marked object is distorted may be easily determined from a change in measured line widths of the guide pattern. In this case, when the marked object is not distorted, since the laser beam may be irradiated at the median focus, the QR code is generated on the marked object by moving to step S150.

In the adjusting of the irradiation angle (S140), the irradiation angle of the laser beam is adjusted, and in step S130 described above, when the marked object is distorted by the change in line width, the irradiation angle of the laser beam is adjusted.

That is, it can be seen that when the line width D3 of the third guideline is measured to be larger than the line width D4 of the second guideline, the marked object is rotated and distorted in the clockwise direction. As such, when the marked object 50 is distorted, the laser beam irradiating apparatus 100 is disposed to be distorted in the same direction as the marked object by using the angle adjusting unit of the laser beam irradiating apparatus 100 as illustrated in FIG. 6. As such, the focus of the laser beam irradiated to the marked object 50 may be easily adjusted by adjusting the angle of the laser beam irradiating apparatus 100.

Meanwhile, the forming of the guide pattern (S110), the obtaining of the image of the guide pattern (S120), the determining of whether the marked object is distorted (S130), and the adjusting of the irradiation angle (S140) are repeatedly performed to accurately adjust the focus of the laser beam for the marked object.

Accordingly, a variation of the line width according to the distorted angle is stored, and the stored data is compared with the measured line width to find the distorted angle therefrom and adjust the irradiation angle.

In the exemplary form of the present disclosure, for example, in the case of a large vehicle, the angle of the angle adjusting unit of the laser irradiating apparatus in which the angle is relatively easy to be adjusted is controlled, but the laser beam may be irradiated to the median focus by adjusting a position of the marked object.

In the generating of the QR code (S150), the QR code is generated by irradiating the processing laser beam to one surface of the vehicle body by a laser after accurately adjusting the focus of the laser beam to the marked object. The QR code may be a concave shape which is dented with a predetermined depth by irradiating the processing laser beam, and a planar shape of the concave shape is verified to identify the marked object.

Like the exemplary form of the present disclosure, when the laser irradiating apparatus and the method of forming the identification mark using the same are applied, even though the position of the marked object is changed, the laser beam may be irradiated with the accurate focus, and as a result, an error of the identification mark formed by the laser may be reduced.

While this present disclosure has been described in connection with what is presently considered to be practical exemplary forms, it is to be understood that the present disclosure is not limited to the disclosed forms, but, on the contrary, is intended to cover various modifications and equivalent arrangements included within the spirit and scope of the appended claims.

What is claimed is:

1. A laser processing device, comprising:
a laser beam irradiating apparatus configured to irradiate a laser beam to an object to be marked;
an angle adjusting apparatus connected with the laser beam irradiating apparatus and configured to adjust an irradiation angle of the laser beam;
a photographing apparatus configured to photograph an area where the laser beam is irradiated; and
at least one guide beam reflective mirror positioned on a movement path of the laser beam,
wherein the laser beam is a processing laser beam or a guide beam which marks the object to be marked, and
wherein the guide beam is reflected on a surface of the object to be marked to display a guide pattern.

2. The laser processing device according to claim 1, wherein
the laser beam irradiating apparatus comprises at least one laser beam reflective mirror configured to change an irradiation path of the laser beam.

3. The laser processing device according to claim 1, wherein
said at least one guide beam reflective mirror is configured to transmit the processing laser beam.

4. The laser processing device according to claim 1, wherein
the guide pattern comprises:
a plurality of first guidelines which are extended in one direction and spaced apart from each other, and
a plurality of second guidelines which are spaced apart from each other and extended in a direction crossing the first guidelines.

5. The laser processing device according to claim 4, wherein
line widths between the first guidelines are the same as each other and line widths between the second guidelines are the same as each other.

6. The laser processing device according to claim 5, wherein when the object to be marked is distorted, at least one of the line widths between the first guidelines reflected on the surface of the object to be marked and the line widths between the second guidelines reflected on the surface of the object to be marked varies, wherein the photographing apparatus is configured to measure the line widths.

7. The laser processing device according to claim 6, wherein the photographing apparatus is configured to measure the line widths reflected on said at least one guide beam reflective mirror.

8. A method of forming an identification mark by using the laser processing device according to claim 1, the method comprising:
preparing the object to be marked;
reflecting the guide beam to the object to be marked to display a guide pattern on a surface of the object to be marked;
obtaining a guide image by photographing the guide pattern;
determining whether the object to be marked is distorted from the guide pattern; and
forming the identification mark on the object by irradiating a processing laser beam from the laser beam irradiating apparatus,
wherein in the forming of the identification mark, when the object is distorted, the laser beam is directed after changing the irradiation angle by the angle adjusting apparatus of the laser beam irradiating apparatus.

9. The method according to claim 8, wherein
the guide pattern comprises:
a plurality of first guidelines which are spaced apart from each other and extended in one direction, and
a plurality of second guidelines which are spaced apart from each other and extended in a direction crossing the first guidelines.

10. The method according to claim 9, wherein,
in the forming of the guide pattern,
line widths between the first guidelines are the same as each other, and
line widths between the second guidelines are the same as each other.

11. The method according to claim 9, further comprising:
determining whether the object to be marked is distorted by comparing line widths of the first guidelines measured each other.

12. The method according to claim 9, further comprising:
determining whether the object to be marked is distorted by comparing line widths of the second guidelines measured each other.

* * * * *